(12) United States Patent
Belser

(10) Patent No.: US 6,185,174 B1
(45) Date of Patent: Feb. 6, 2001

(54) DISK DRIVE SYSTEM HAVING HYBRID ANALOG/DIGITAL PULSE PEAK INSTANCE/ AMPLITUDE DATA DETECTION CHANNELS

(75) Inventor: Karl A. Belser, San Jose, CA (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/132,962

(22) Filed: Aug. 12, 1998

Related U.S. Application Data

(60) Provisional application No. 60/073,284, filed on Jan. 31, 1998.

(51) Int. Cl.[7] ............................................. G11B 7/00
(52) U.S. Cl. ........................ 369/59; 369/47; 369/124.01
(58) Field of Search .............................. 369/59, 42, 48, 369/49, 50, 54, 58, 32, 124.01; 360/48, 39, 51, 53

(56) References Cited

U.S. PATENT DOCUMENTS

| | | | |
|---|---|---|---|
| 5,321,559 | 6/1994 | Nguyen et al. | 360/46 |
| 5,455,813 | 10/1995 | Hayashi | 369/59 |
| 5,508,993 | 4/1996 | Hayashi et al. | 369/124 |
| 5,523,987 | 6/1996 | Muto | 369/32 |
| 5,668,678 | 9/1997 | Reed et al. | 360/51 |

FOREIGN PATENT DOCUMENTS

| | | |
|---|---|---|
| 0300826A2 | 7/1987 | (EP) . |
| 0300826A2 | 7/1988 | (EP) . |
| 0521646A1 | 7/1991 | (EP) . |
| 0 521 646 | 1/1993 | (EP) . |
| 0652559A2 | 11/1993 | (EP) . |
| 0 652 559 | 5/1995 | (EP) . |
| 2269727A | 8/1992 | (GB) . |
| 2269727 | 12/1992 | (GB) . |
| WO93/23941 | 5/1992 | (WO) . |
| WO93/23941 | 5/1993 | (WO) . |

OTHER PUBLICATIONS

Melas P. Sutardja, "An Asynchronous Fully Digital Channel For Magnetic Recording," Proceedings of the global telecommunications conference, San Fransisco, Nov. 28–Dec. 2, 1994, vol. 2, Nov. 28, 1994 pp. 1144–1147 IEEE.

C.M. Melas, P. Sutardja, "An Asynchronous Fully Digital Channel For Magnetic Recording" Nov. 28, 1994, IEEE Globecom, SanFransisco, pp. 1144–1147.

Primary Examiner—Muhammad Edun
(74) Attorney, Agent, or Firm—Shawn B. Dempster; Edward Heller

(57) ABSTRACT

In disk drives incorporating the present Peak Detection Channel invention (PDC) an important feature is the ability to locate the data on a disk. Servo timing sectors for each data track are recognized by the embodiments of the invention cooperating with system electronics at start up of the disk drive system. Variation of data pulse heights, widths and shapes over a broad range are accommodated. The invention takes advantage of the fact that typical pulse shapes (e.g. Gaussian or cosine-squared) can be closely approximated near their peak by a parabolic curve.

10 Claims, 10 Drawing Sheets

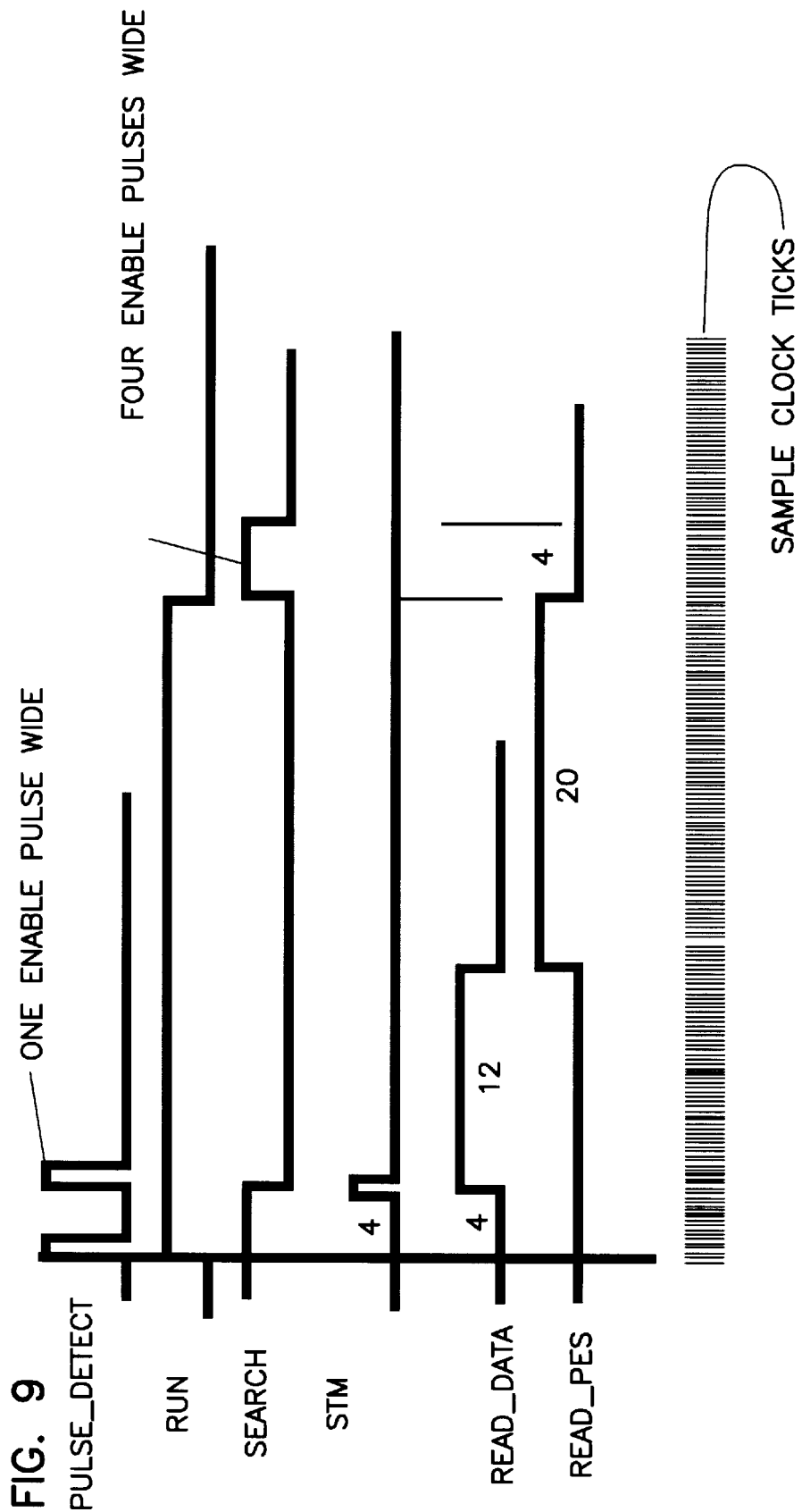

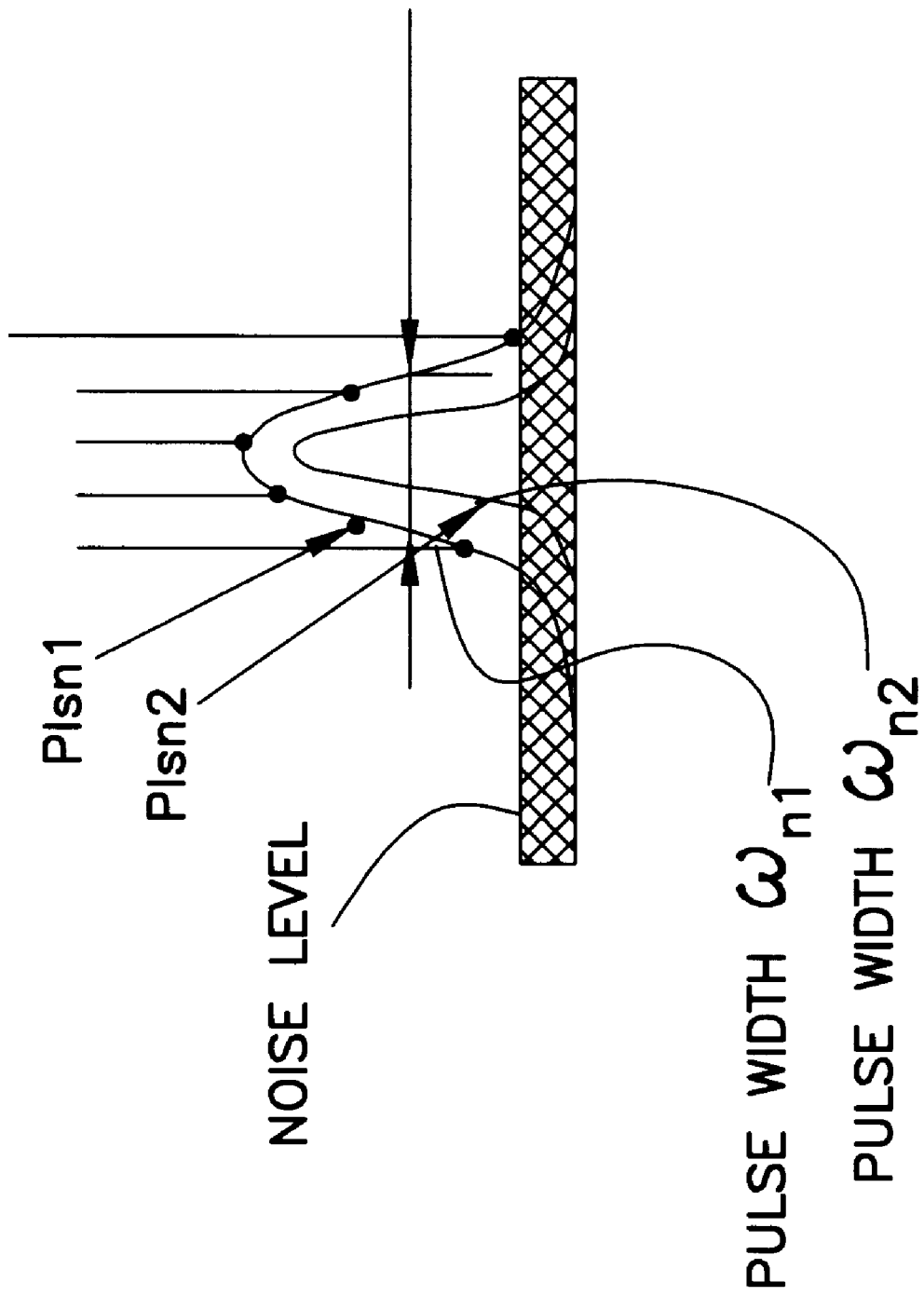

DISK DRIVE SYSTEM HAVING HYBRID ANALOG/DIGITAL PULSE PEAK INSTANCE/ AMPLITUDE DATA DETECTION CHANNELS

RELATED APPLICATIONS

The present invention is related to and claims priority from commonly assigned Provisional Application 60/073, 284, filed on Jan. 31, 1998, and is incorporated herein by reference.

BACKGROUND OF THE INVENTION

The present invention relates generally to pulse data recovery in optical media disk drive data storage systems. More specifically, the present invention relates to data recovery systems that rely on recovering stored data from pulse waveforms having varied peak amplitude and/or varying peak instances relative to a known time base.

BACKGROUND ART

Disk data storage systems generally use either magneto-inductive, magneto-resistive, magneto-optical or purely optical data recording/reading techniques with the appropriate media. Data is stored on the disk media in an organized manner designed to cooperate with the electrical and mechanical control components of the disk drive system.

In optical and magneto-optical disks the areas on the disks are typically organized or formatted with different areas dedicated to different functions. A central portion of the disk may contain a start up zone which is used to calibrate the system when it is initialized. User data is arranged in a number of spaced apart data sectors extending radially outward from the start up zone to the disk outer diameter. User data sectors are typically separated by servo sectors. The servo sectors contain information used by the system to identify particular data storage locations by some reference coordinate system, typically radial and circumferential measures relative to some reference origin location.

Radial bars of data bits on the disk can be used to define circumferential position, (i.e., index sector number, e.g., sector 1, 2, . . . , recoverable by a read/write head and processed by a disk drive control system). Magnetic disks are commonly written with similar servo sectors defined in magnetic form.

Servo patterns are generally of constant angular spacing for good reason; it greatly simplifies reading the circumferential position at any radius.

User data is typically stored in a plurality of semi circular arc segments of contiguous data bit locations concentrically disposed about the disk center. The user data arc segments are disposed between semi circular arc segments of data bit locations that include servo sector data bits and may include other system information. The servo sector data bits may include a servo timing mark, or STM. The STM can be encoded to provide coarse disk position information to the system; for example to define which of the radially spaced semicircles is under the read/write head.

Magnetic recording and reading of data patterns typically results in a recovered data signal having two immediately adjacent pulses of opposite sign indicating the transition between two adjacent and oppositely magnetized magnetic domains. The transition from one magnetization to the other can be used to indicate a change in stored user data from one binary logic value to its opposite.

Magneto-resistive, optical and magneto-optical data recording and reading generally results in a unipolar pulse indicating the presence of a binary logic value and the absence of the unipolar pulse indicating the opposite logic value. The unipolar pulse results from an increase (or decrease) in amplitude of a returned signal picked up by the read/write head from the disk. The returned signal is generally a response to a constant intensity source signal directed at the recording area (the data bits) of the disk by the read/write head as the disk surface passes thereunder.

In the unipolar data pulse case, typical of optical and magneto-optical drives, timing of the pulses (and their absence) becomes very important in order to properly recognize the logic value associated with pulse presence/absence. This is accomplished by a writing means for writing data into data bit locations of the disk system and a reading means for reading data pulses from data bit locations having stored data. This is nearly always associated with a fixed system clock associated with the reading device, which may be different from a fixed clock provided by the data writing device.

In magneto-optical drives, advantage can be had by making the servo sector data writing/reading means orthogonal to the user data reading/writing means. For example the servo sector data bits can be read by a photosensitive device as attenuated reflection of an incident laser beam from pits written by laser pulses from a master writer device on an otherwise uniformly reflecting disk surface. Conversely the user data can be read by a polarization sensitive device from polarized reflected light from user data locations on the uniformly reflecting surface written by magneto-optic polarization shifting effects (the Kerr effect).

In the unipolar data pulse environment provided by a magneto-optical drive, radial bars (i.e., pits formed in contiguous overlapping radial alignment) in the servo sector may be used to aid the disk system in identifying circumferential position of data sectors. An index or reference origin sector can be defined with the following sectors, sector number 0, sector one, sector two, etc.

One example of an architecture for a disk format is the NOID system from IBM (TM). One purpose of the NOID system is to encode a coordinate system (radial and angular position) on the disk without the use of gross physical elements. Radial and angular position coordinates on the disk are described by the data architecture or format of the servo sectors.

In magnetic disk technology, this information is written magnetically on the disk. In optical or magneto-optical disk technology the servo sector data information may be molded or embossed permanently into the recording surface. Typically a master disk is written with a formatted system data pattern (servo sector data and the like) using a precise laser beam master writing system to expose a photo resist coated master disk. A photolithographic development and etching process then leaves micro pits or indentations that form the embedded servo information. Currently master disks having servo data bits with about two nm position accuracy can be made commercially by firms having suitable master disk laser writing equipment. Daughter disks containing the embedded servo and coordinate system data can then be printed from the master disk for use in end-user systems.

Servo sector data patterns are typically written with constant angular spacing between adjacent bit locations. This simplifies servo data recognition although this causes lower servo data density toward the outer perimeter of the disks. Thus, careful attention to the architecture of the servo data is important to insure efficient use of costly disk area. If the servo sector data bit locations were not of constant angular spacing, the disk system would have to recognize variable frequency encoded data in the servo sector. Doing this by using pulse data decoding channels incorporating variable frequency oscillators (VFO's) is possible. VFO's however, typically take a long time to synchronize, i.e., taking up many bits, so a servo sector data field for use with a variable frequency oscillator data retrieval channel would be too long for efficient formatting.

The read/write head of the disk drive system is positioned on the disk surface by a read/write head servo system. The read/write head is typically positioned approximately radially along the disk surface by an actuator arm having a rotary base assembly mounted adjacently to the disk outer perimeter. The designer of the servo system driving the actuator arm, having knowledge of the geometry of the system can design the system to use the present track number information obtained from the servo sector data, to move the head rapidly to the radial position where the next target track is located.

By reading the STM and encoded system coordinate information of each sector as it passes under the read/write head, a disk drive control system (DDCS) may derive the ID number and relative arrival timing of the servo sectors. The DDCS is typically provided with means to synchronize read and write commands to the read/write head to access the recorded user data bits at a desired data track segment following thereby. It is important that the read/write commands be properly synchronized to the position of the data sectors under the head, otherwise, incorrect data could be read from or written to the wrong data sectors.

One key parameter for synchronizing the beginning and ending of read/write commands to the head is the relative timing of the data pulses derived from the embedded data bits in the servo sector. The DDCS must not only decode the servo sector ID data therefrom but must precisely locate the STM and yet have time to set up a time delay to apply the read/write commands to the selected user data segment that follows. A system clock of fixed frequency is generally used to provide a known time base to use in the control of read/write command timing.

The variability of media characteristics, laser power, disk rotational speed and the radial position variation of a specific data track on a rapidly rotating disk poses significant challenges to designing data retrieval systems. The eccentricity of the disk caused by mounting tolerances and the like, causes data tracks passing under the read/write head to wander in and out radially as the disk rotates.

Spindle motor speed variations from the nominal design value cause the arrival time and/or spacing of the data bits of the servo segments and data segments passing under the head to vary correspondingly from nominal expected values. The servo system of the DDCS that controls the read/write head position and the read/write electronics that control the timing of read/write commands therefore must follow these eccentricities and speed variations to avoid misinterpreting the servo sector data and consequently reading or writing data to an incorrect user data segment or bit. Providing a pulse data recovery system that is insensitive to the speed variations of the disk for the length of the data patterns comprising the servo sectors is therefore very important.

The variability of laser power, media non-uniformity, and laser pulse energy density variation between inner and outer radial positions can also cause variability in the size and shape of the data bits that are read. Consequently, the data pulses retrieved from the varying data bits may have considerable variability in amplitude and pulse width.

If there is uncertainty in timing, the system could miss one servo sector because it was not decoded properly due to speed variation of the disk, e.g., too fast or too slow. The system could miss one or more of the pulses read from an STM if the data rate varied enough to cause a cycle slip relative to the system clock. Thus, there could be uncertainty in the timing of where the data sector starts. If data is to be written into two adjacent data sectors, the system must not mistakenly write over one sector and erase the sector in front of it.

In some cases, if tolerances are held close enough, that cycle slip correction does not have to be done. However, tighter tolerances require more expense. Tradeoffs must be made between the costs of holding closer tolerances and the costs of paying for synchronization provided by a more precise controller.

Incorporating a VFO to lock the system clock to the data by sensing the servo sector frequency is undesirable since lengthy VFO fields would increase the loss of data bit positions at the outer edge, aggravating data packing capacity on the disk.

Methods are known which provide for read/write heads to follow eccentric data tracks. System data patterns having position error signal (PES) codes can be permanently encoded as part of the master pattern in the servo sectors. This enables an appropriately configured DDCS servo system to follow the centerline of the radially eccentric data tracks. PES code data typically is written on the disk, offset from the data track nominal centerline. It is known that detection of the position error code data with a known offset relative to one side or the other of the center line, can be processed and used to re-center the disk drive read/write head over the desired data track center line.

Some PES position correcting methods depend on integrating the amplitude of multiple pulses offset on either side of the data track center line, e.g., A pulses on one side and B pulses on the other. The difference between the two integrals of A pulse amplitude and B pulse amplitude can be used to re-center the read/write head over the data track.

The data architecture of the servo sector is an important element of the overall system architecture. The coding methods, error correction methods, data bit detection method and the like, affects the number of bit locations required for the servo sector and the number of bit locations available for user data, i.e., the format efficiency.

These features are influenced by the various system tolerances, e.g., disk motor speed variations, which primarily affects the over all data efficiency related to the data structure. Data bit gaps or spaces may be required between servo sectors and data sectors. Depending on the relative size of servo and data sectors and motor speed tolerances, format efficiency can be adversely influenced To accommodate the differences in timing between the clock and the media speed, the data sectors may be moved farther apart. Then, when a write pulse comes early, it does not write over the end of the previous data sector. However, this reduces format efficiency.

As drives of higher density are developed, much better control of the system clocking is required. Even with improved clocking there is not much improvement in the problem of reading PES pulse amplitude and timing position. The first requisite when the drive comes on, is to read the servo timing mark. A good clock synchronized to the disk cannot necessarily be assumed at that time, because the servo must be read first.

Methods are also known for processing pulse data trains having pulse arrival times, amplitudes and widths that vary from nominal values. Generally, the design of such systems is relatively difficult. These systems tend to be complex and cost significantly more than desired.

The pulse data retrieved from the encoded pits in a magneto-optical (MO) disk drive system contain two types of information; pulse position (relative to a fixed clock), and pulse amplitude. Since the embedded and permanently written system data is encoded under very tightly controlled conditions, it is inherently more uniform than the user data. This uniformity of the pulse amplitude and pulse position of the servo sector data can be used to compensate for variability in user data pulse amplitude and position. Being able to read both pulse position and pulse amplitude of the STM marks and PES codes is very important to be able to take maximum advantage of sophisticated servo positioning and dynamic system calibration methods.

Some known analog and digital signal processing techniques for processing high data rate, variable pulse position and amplitude signals are: threshold detection, peak detection, envelope detection, synchronous detection, and pulse integration. These are ranked generally with increasing cost and performance. The tradeoffs between better signal sensitivity, signal-to-noise ratios, timing and amplitude precision is generally inversely related to cost.

Today, threshold and peak detection are rarely, if ever, used in high performance disk drives because of their limitations. Designers are turning instead to various detection techniques using envelope, integration or synchronous detection.

Integration detection over an extended portion of a pulse includes signal values that are at or close to zero values. Signal points near zero have almost no information about the peak amplitude or location in time but do contribute noise, thereby introducing more uncertainty about the signal peak amplitude and location in time. Signal points close to the peak have lower noise contribution than points far from peak.

A matched filter, i.e., synchronous detection, can contribute even lower noise than integration. For example, a sine wave signal with noise, if rectified and integrated, has a certain signal level and a certain noise level. If the same signal is multiplied by a detector sine wave of the same period, the high values of the sine wave signal will be weighted by high values of the detector sine wave and all the low values of the signal by low values of the detector sine wave. The output will be a constant, plus a series of AC terms; i.e., the signal has been heterodyned down to DC. The noise contribution at low signal levels has been de-emphasized compared with integration detection thereby yielding an improved signal-to-noise ratio.

Previous implementations of synchronous and integration detectors however, have depended on sophisticated (and therefore expensive) analog and/or digital signal processing techniques. Previous detectors using threshold/peak/envelope detection have been cheaper but have marginal or inadequate performance compared with synchronous detection and pulse integration detection. However, for new drives and new drive architectures, size, weight and cost of these known techniques make it difficult to achieve desired performance levels within the limited budget parameters.

Synchronous detection and integration detection of pulses is also more difficult to implement in the disk drive environment because of the variation of servo sector data pulse spacing in time from the inner to an outer radius and the variability of pulse width and amplitude.

Referring to FIG. 10 there are shown two representative pulse shapes that should be detectable. A first pulse plsn1 is illustrated to have a relatively larger amplitude and wider pulse width Wn1 relative to a pulse width Wn2 of a second pulse plsn2 when measured at its Full-Width-Half-Magnitude (FWHM) or 50% point. Plsn1 may represent pulses from servo data bits near the center of an optical disk in an optical disk drive system where pulse plsn2 may represent servo data bits near the outer diameter (OD).

The problem of variability can be lessened by tightening the manufacturing and assembly tolerances of the master disks, the mechanical and electrical components of the hardware assemblies and by controlling temperature, humidity and the like, again at higher cost and possibly with lower reliability.

Therefore, one challenge for a high performance disk drive system is to detect the variations in pulse amplitude and pulse position of data bits at high data rates with low cost and low complexity.

The media itself presents a different problem. Optical media can be either first surface optical media, or second surface optical media. A second surface media has a transparent coating, e.g., polycarbonate, over the recording medium below. This is used in CD-ROM or DVD. These methods focus light through the polycarbonate to the media below. Any dirt on the surface will be slightly out of focus so is less likely to be recognized as data. This does cut down the intensity of light from the laser source, and consequently decreases the signal-to-noise ratio of the data retrieval channel.

In high performance optical disk drives, first surface recording is more commonly used. That is, there is no over coat, consequently any particle present will be recognized as a signal. A dirt particle will typically be larger than two adjacent data bits. An encoding system which uses threshold detection is likely to interpret a dirt particle as multiple adjacent data bits.

Dirt on the disk surface can be of sufficient size and density to a false attenuation of reflected light, thereby appearing to the read/write head and detection electronics as a false data bit or bits.

One method of reducing the effect of particles in data retrieval channels is to use pulse position coding and pulse position modulation (PPM). The PPM method can detect the presence of a large dirt particle in that each data bit will not appear to be a clearly defined pulse. A PPM modulation and coding system can discriminate an NRZ data structure created by dirt particles since the faulty signal does not return to 0 between adjacent pulse positions as would two adjacent actual pulses. PPM modulation allows recognition of a dirt particle which can enable the system to ignore faulty sectors and thereby provide enhanced user data integrity. System design can accommodate such events by ignoring the data segment with such a data pattern. Still, there is some chance, though small, that a dirt particle could represent a single bit or succession of single bits.

Sophisticated signal processing techniques that rely on reading the variability of signal level and timing are of little use during the initialization of the systems described above. Until the system can recognize the servo sectors, no data can be accumulated to compensate for variability. The first thing the disk drive system must do is to read the servo sectors to initialize the system: then special techniques can be used, e.g. locking on to the STMs.

A servo sector encoded with an appropriate servo timing mark using pulse position modulation encoding can provide superior performance over that of threshold detection. However, this places significant challenges to the design of such system to keep cost low and performance high. Three of the most important areas to be addressed in such high performance and constrained budget data storage systems are: 1) detection of the peak amplitude of data pulses retrieved from the disk. 2) detection of the STM patterns, and 3) accounting for the synchronism of the instances of servo data pulses and the frequency (or period) of a system clock over the data pattern comprising the servo sector.

It would be an advantage to provide a disk drive storage and retrieval system having a fast, low cost, pulse position modulation encoding/decoding data retrieval system that can approach the performance of a synchronized detection channel for superior performance in accommodating the challenges outlined above.

SUMMARY: OBJECTS AND ADVANTAGES

In embodiments of disk drives incorporating the present Peak Detection Channel invention (PDC) an important feature is the ability to locate the data on the disk. The servo timing sectors for each data track are recognized by the embodiments of the invention cooperating with system electronics at start up of the disk drive system. Variation of data pulse heights, widths and shapes over a broad range are accommodated. The invention takes advantage of the fact that typical pulse shapes (e.g. Gaussian or cosine-squared) can be closely approximated near their peak by a parabolic curve.

The present invention first detects that instance of occupance of a unipolar data pulse having a quasi-Gaussian envelope characterized by a single amplitude peak Ap and a Full-Width-Half-Maximum (FWHM) pulse width Pw. The detection of the instance of data pulse occupance is achieved by sampling the data pulse amplitude regularly with a sample period at least less than about ⅓, but preferably more than about ⅕ of the data pulse width Pw. In addition, a pulse detect signal is enabled following the condition that the magnitude of a center sample of three consecutive samples is greater than or equal to the magnitude of one of the two adjacent samples and is greater than the magnitude of the other adjacent sample.

Second, a preferred embodiment of the invention provides that the unipolar pulse has a peak amplitude which has occurred within a period of no more than one-half the sample period on either side of the center sample.

Third, a preferred embodiment of the invention provides an estimate of the unipolar pulse peak amplitude.

Fourth, a preferred embodiment of the invention provides an estimate of the instance of the peak occupance relative to the center sample.

Fifth, a preferred embodiment of the invention provides an automatic phase correction synchronizer for re-centering the peak of an asynchronous detected pulse in the center of a fixed rate multi-phase sampling frame.

A preferred embodiment of the invention provides an estimate for the peak amplitude and peak time occupance of a detected pulse relative to the center sample of a multi sample frame derived from an equation for a parabolic curve fit to the three sample points, when the center sample is greater than or equal to one of the adjacent samples and is greater than the other adjacent sample.

An estimate to the peak time instance tpj and peak amplitude position Apj of data pulses P in the received data signal Dpsj. Each pulse Pj is sampled asynchronously with a high frequency sample clock having a sampling period Tclk more than about ⅕ and less than about ⅓ a nominal minimum pulse period Tpsmin. The Tclk provided in the system 100 is at such a rate that several consecutive samples hit each pulse at an amplitude above a threshold value.

A peak, Apj occurs in an interval of plus or minus half of a sample period, Tclk, from the center sample x2 when:

$$x2>x1 \text{ and } x3<=x2$$

that is when the middle sample of three consecutive pulse samples is greater in magnitude than the sample before and greater than or equal to the magnitude of the sample after the middle sample.

The parabolic estimate of the time offset Toffset, of the peak Apj from the second sampling instant is:

$$\text{Toffset}=\text{Tclk}/2*(\{x1-x2\}/\{x1-2*x2+x3\})$$

The parabolic estimate of the peak amplitude Apj is:

$$Epj=x2+(x1-x3)^2/(-x1+2*x2-x3)/8$$

An approximate value of the peak amplitude (within +/−4%) is:

$$E'pj=x2+|x1-x3|/8$$

In a particular embodiment of the invention, the pulse waveforms' amplitudes are sampled at about 50 MHz. The amplitudes are sampled with a high-speed 8-bit flash A to D converter (ADC). The sampled amplitude values and identifying sample clock ticks are processed by subsystems of the invention to determine the accurate time instance of a data pulse relative to the timing of a system logic bit frame. Further processing of sampled data pulse amplitudes and identifying sample clock ticks by embodiments of this invention provide accurate estimates of the instances of the pulsed data peak occurrences and estimates of the pulsed data peak amplitudes. These estimates are provided for use by the detection and control electronics of the disk drive system to enable system performance enhancements, e.g. PES processing and the like. A digital peak instance detection embodiment is also an invention in itself.

In a disk drive embodiment of the invention, following the detection of a first pulse of an STM, succeeding pulses are evaluated until the detector determines an STM is present. Once an STM is detected, which determines where the data in the servo sector is located relative to the system logic bit time, the system can process the following values of pulse peak instance and amplitude, e.g. process the PES data pulses to follow the data track's eccentric movement. Each time a pulse peak instance and amplitude is provided by the invention, it is stored; then when other predetermined conditions are met, the system processes the stored pulse data to take corrective action.

Objects of the Present Invention Include:
1. a Pulse position detection channel having high performance.
2. a Pulse position detection channel having low cost/complexity.
3. an Optical disk drive system with improved performance with a simple digital pulse position/amplitude detection channel.
4. a Pulse position detection approaching synchronous detection without locking clock to data.
5. a High performance pulse peak amplitude and peak instance location detection system with simple, low complexity, i.e., inexpensive, digital logic circuits.
6. an Improved margin for data-to-clock synchronism/disk speed control tradeoffs.

7. a Digital method for detecting the instance of pulse peak amplitude occupance of pulses having variability in peak amplitude, pulse width and spacing relative to an asynchronous clock.
8. a Digital method for estimating the instance of pulse peak occupance and the pulse peak amplitude of pulses having variability in peak amplitude, pulse width and spacing relative to an asynchronous clock.
9. a Digital method for estimating the instance (occupance in time) of a pulse's peak position (amplitude extreme) relative to an asynchronous sampling clock by using a simple flash A/D converter, simple comparators and simple logic circuits activated by the values of three successive pulse samples that fit on an approximating polynomial curve.
10. a Digital method for detecting pulses having variability in peak amplitude, pulse width and spacing.

An advantage of one preferred embodiment of the invention is a synchronizing correction circuit that keeps the center sample of the three comparison samples within one sample clock of the nominal center sample clock. This minimizes the chance that a servo sector data bit will be misinterpreted due to disk speed variation.

An additional advantage of one preferred embodiment of the invention is a pattern recognition STM detector using logical data zeros in additional bit positions leading the STM recognition pattern in combination with the digital peak pulse detector of this invention. This reduces the probability that a dirt particle will cause an inadvertent misinterpretation of a servo sector.

FIGURES

Figure 6:
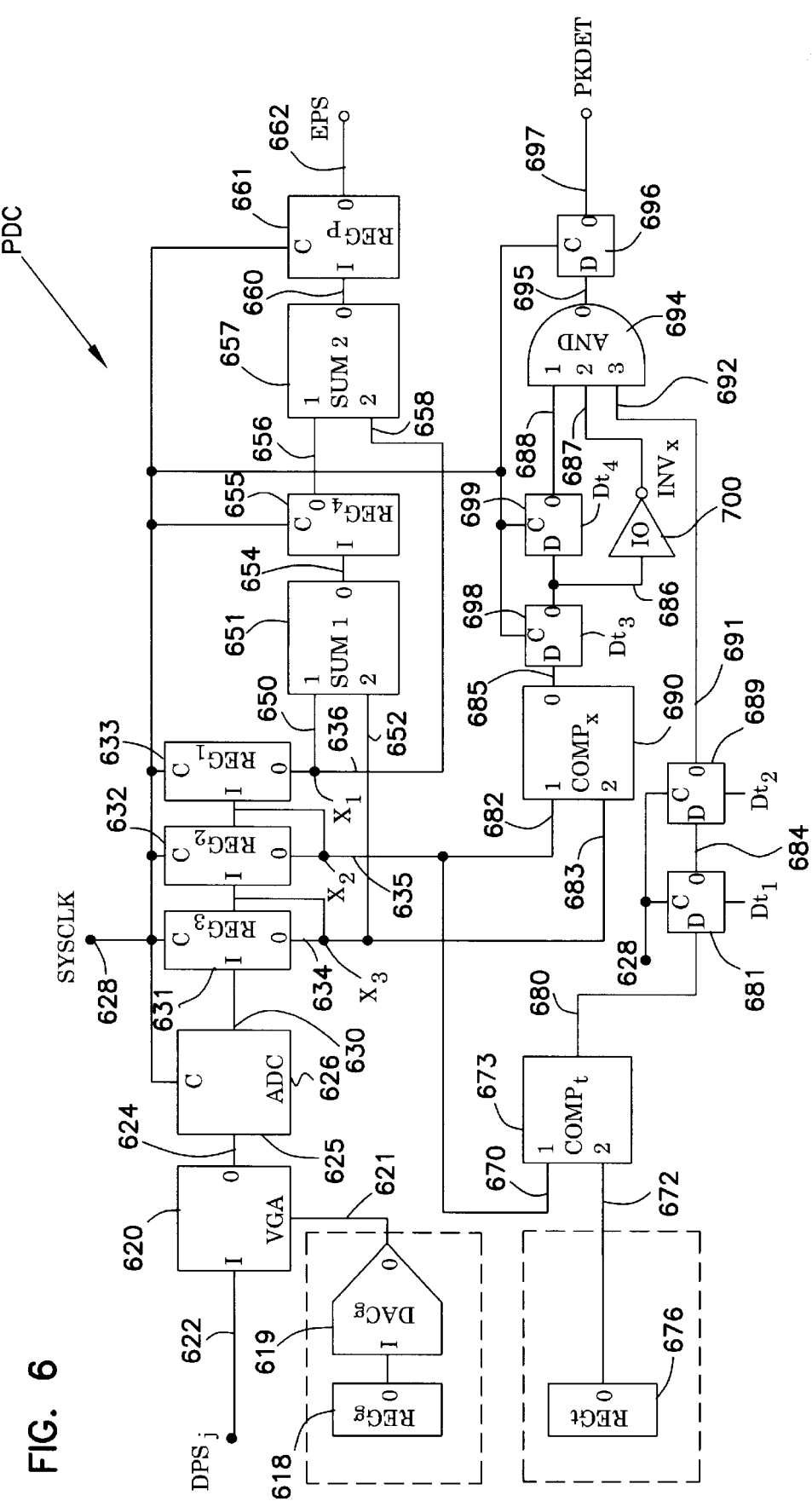

FIG. 6 a block diagram of an embodiment of a Peak Detection Channel (PDC) circuit of the present invention.

Figure 7:
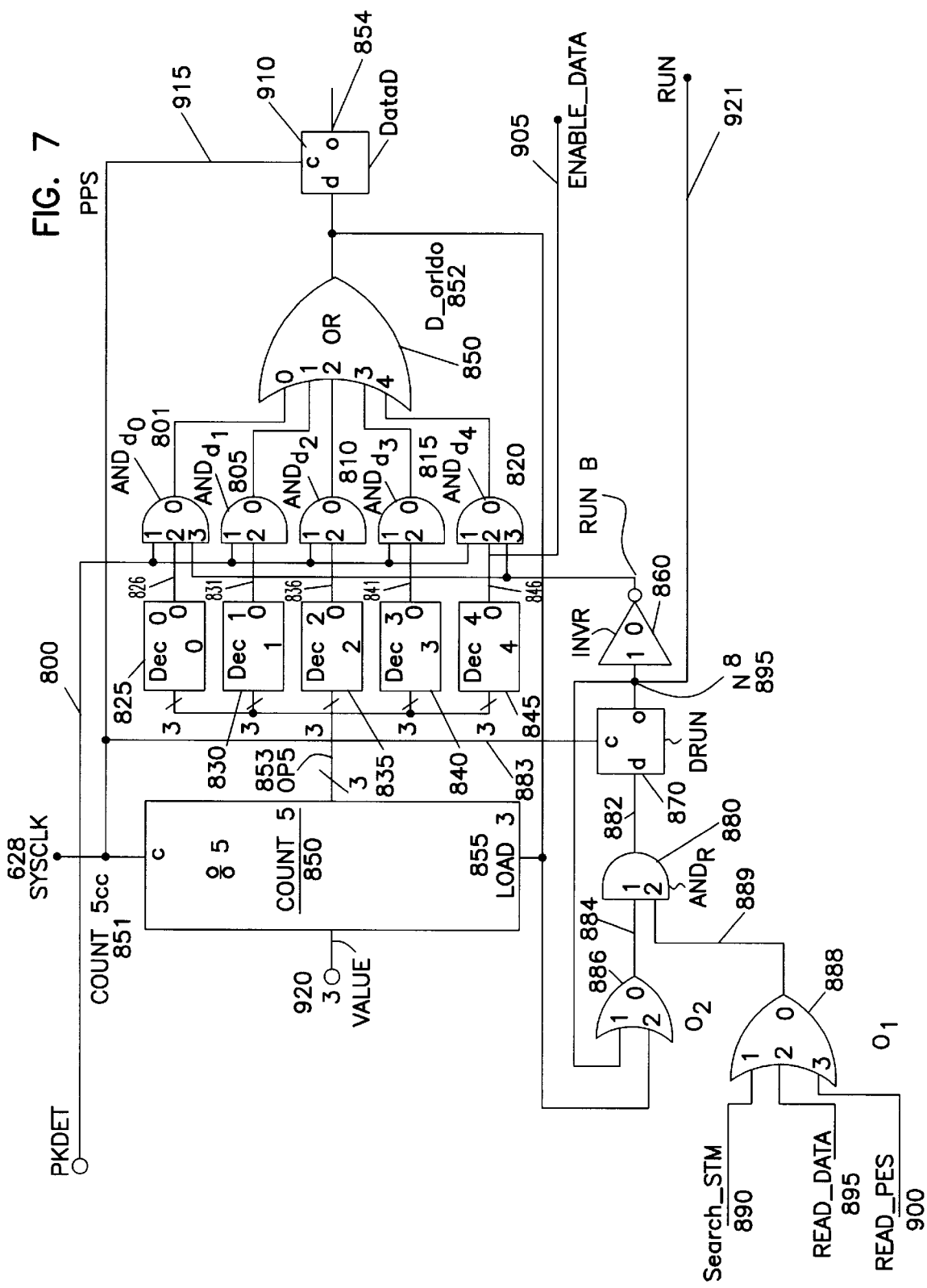

FIG. 7 a block diagram of a Pulse Peak Synchronizer Circuit (PPS) circuit of the present invention.

Figure 8:
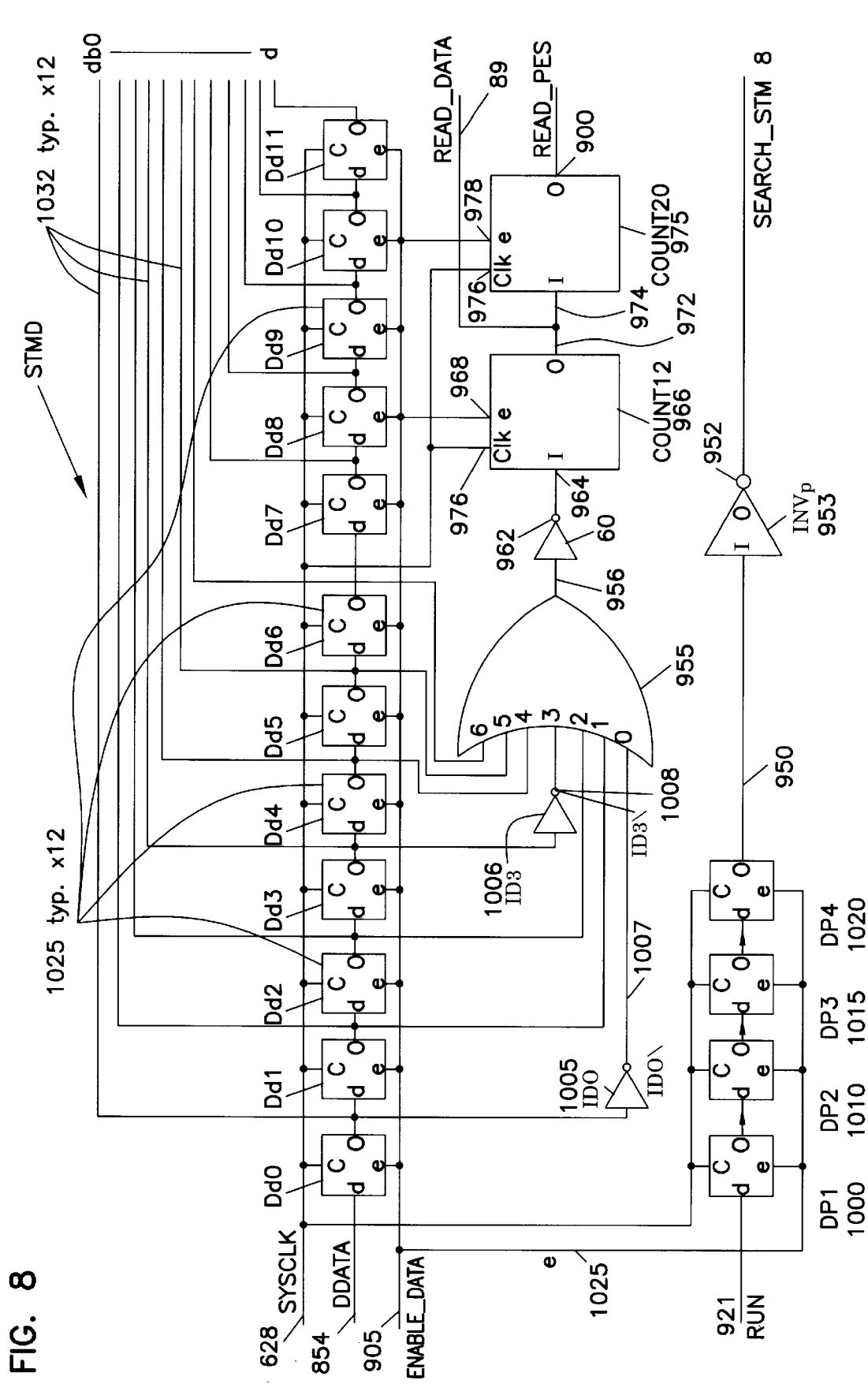

FIG. 8 a block diagram of a Servo Timing Mark Detector (STMD) circuit of the present invention.

FIG. 9 is a graph of signals in the PDC and STMD circuits of the embodiment of FIGS. 6–8.

FIG. 10 is a graph of representative pulse signal variation.

DETAILED DESCRIPTION

Figure 1:
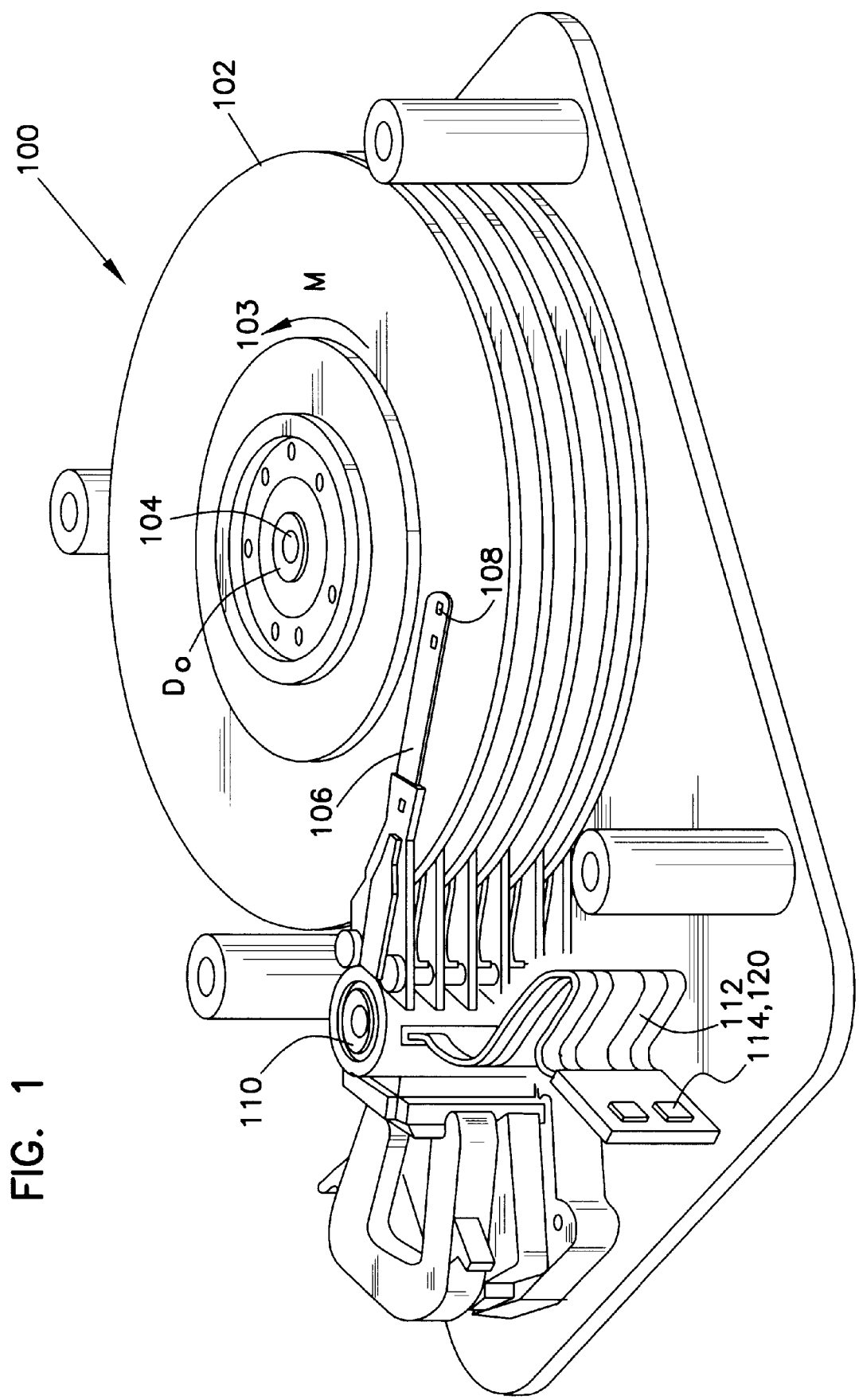
FIG. 1 depicts an optical disk drive system incorporating the present invention

Referring to FIG. 1 there is shown an example of a disk drive system 100. A plurality of disks 102 having respective center holes Do are mounted on a drive spindle 104 therethrough. The disks 102 rotate counter clockwise (indicated by the arrow M) with a rotating speed (rpm). A set of actuator arms 106 have distal ends that carry flying read/write heads 108 above a surface 103 of respective storage disks 102. A rotary actuator assembly 110 is connected to a proximal end of actuator arms 106. The rotary actuator assembly 110 supports and positions the actuator arms 106 and heads 108 across the surface of disks 102 by rotary motion thereabout. Data pulse signals (discussed below) are retrieved from each respective disk surface 103 and transferred to a disk drive control system (DDCS) comprising respective signal processing electronics 114. In one embodiment, the signal processing electronics 114 may be located at some remote distance from the head 108. In other embodiments, the signal processing electronics 114 may be located on the head 108.

Figure 2:
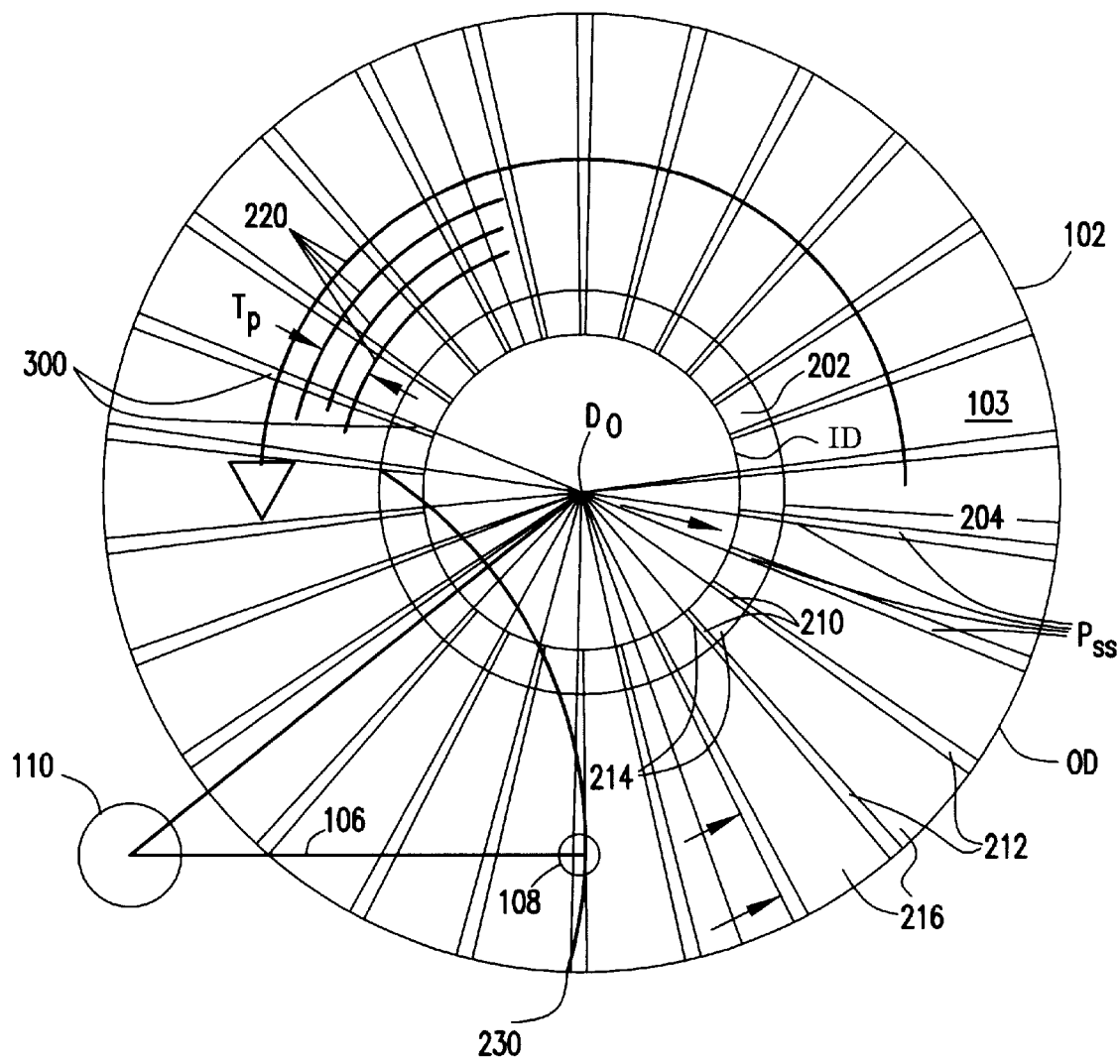
FIG. 2 is an illustration of an optical disk showing the data sector architecture of the drive system of FIG. 1.

Referring now to FIG. 2, there is shown a plan view of one surface 103 of the disk 102. For the purposes of describing an embodiment of the present invention, a particular data architecture of the surface 103 of the disk 102 is described. The surface 103 includes an inner startup zone 202 uniformly surrounding the center hole Do and extending radially outward to an inner diameter ID. An outer zone 204 extends from the inner diameter ID to an outer diameter OD.

The inner startup zone 202 and the outer zone 204 are circumferentially divided respectively into a plurality of uniformly and circumferentially spaced apart wedge shaped servo sectors 212 extending contiguously outward from the center hole Do.

A corresponding plurality of wedge shaped, spaced apart data sectors 216 are interposed circumferentially between and adjacent to each of a respective pair of servo sectors 212 within the outer zone 204. The data sector 216 comprises a plurality of data bits separated by a constant linear spacing along the data tracks 220.

The actuator arm 106 moves the head 108 when positioned by the actuator assembly 110 for retrieving data pulse signals from a plurality of radially spaced apart, concentric, circular data tracks 220 centered about the center hole Do. The data tracks 220 are spaced apart radially with a nominal constant data track pitch Tp beginning in the start up zone 202 and extending towards the outer diameter OD.

Figure 3:
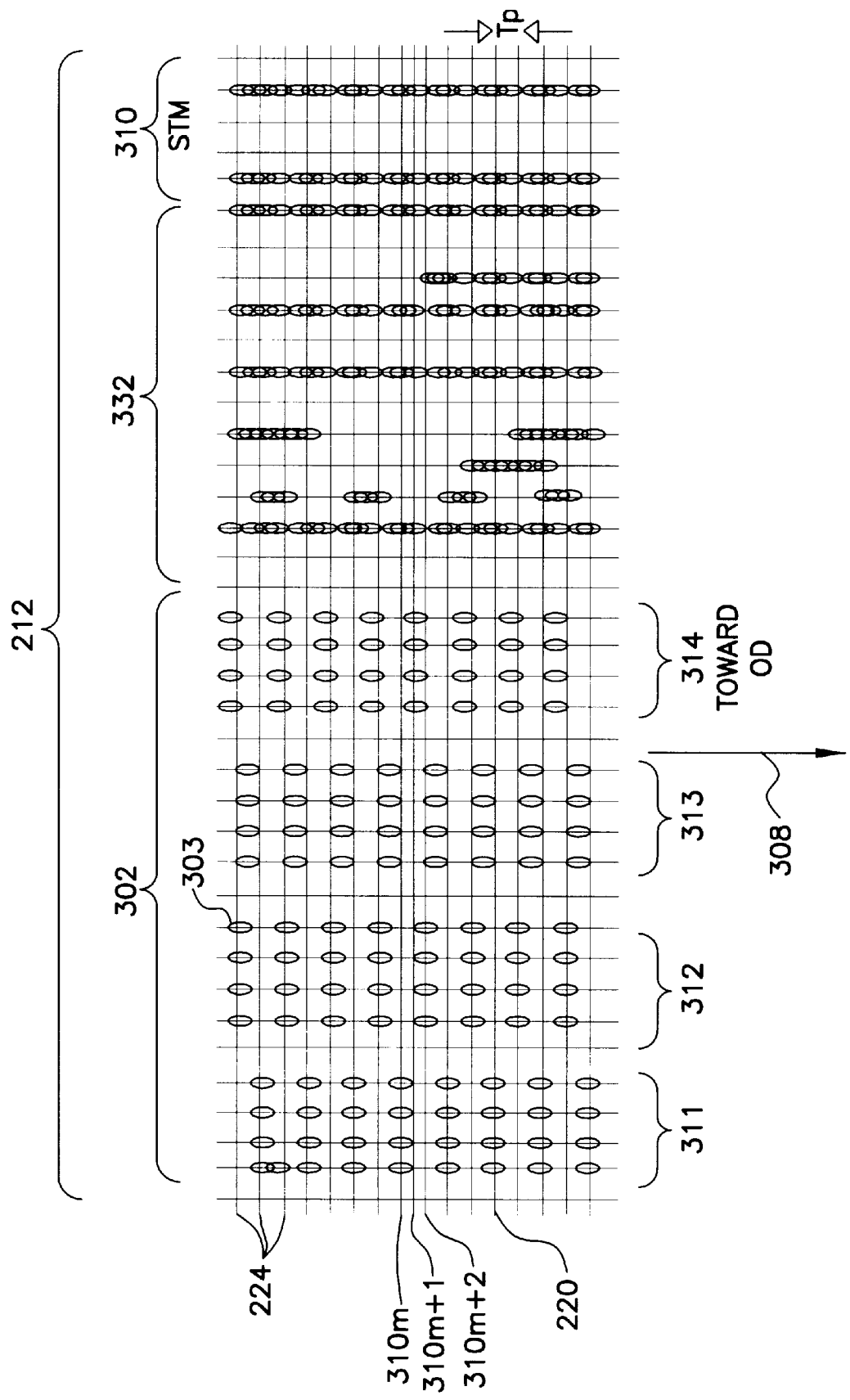
FIG. 3 shows a schematic view of the topology of the data bit architecture of FIG. 1.

Referring now to FIG. 3, there is shown a highly magnified portion 300 of a typical servo sector 212 of FIG. 2. In embodiments of the present invention, an important feature is the ability to access data locations on the disk 102. The servo sectors 212 comprise encoded information including a coordinate reference system that furthers of this ability. In the preferred embodiment, the data tracks 220 spanning each servo sector 212 contains three kinds of encoded information: servo timing marks (STM) 310, data track address marks 332, and fine circumferential position error signal (PES) servo burst marks 302. The encoded information in the servo sectors 212 may be written by a master laser writer in the form of embedded pits 303. A representative embedded pit is indicated by 303. In the preferred embodiment, the embedded pits 303 are written along certain ones of a plurality of master tracks 310$m$, 310$m$+1, 310$m$+2 . . . . The master tracks are concentrically disposed and centered around Do, and equally spaced and separated by a track pitch Tp/2, wherein the data tracks 220 comprise alternate ones of the plurality of master tracks.

The servo timing marks 310 comprise a first pattern of embedded pits 303 that are written from the OD to the ID and the certain ones of the master tracks 310$m$, 310$m$+1, 310$m$+2 . . . to form continuous radial lines. The disk drive control system DDCS of the disk drive 100 may be configured to recognize the first pattern as marking the start of the servo sector 212 each time the first pattern is detected, regardless of the radial position of the read/write head 108 relative to the disk surface 103.

In the preferred embodiment, the data track address marks 332 comprise a second pattern of individual embedded pits 303. The second pattern is decoded by the DDCS and used as address pointers for identification of particular data tracks 220.

In the preferred embodiment, the position error marks 302 comprise a third pattern of individual embedded pits 303. The third pattern comprises four concentrically disposed segments 311, 312, 313, 314. The third pattern is used to derive position error signals for performing position adjustments of the read/write head 108 over a particular data track 220 during track seeking and following as is well known in the art.

Each embedded pit 303 is characterized by three dimensions that are carefully controlled by the master laser writer during the master writing process: an elliptical radial pit width (erpw) 340, an elliptical circumferential pit width (ecpw) 342 and an embedded pit depth (epd) 344 (not shown). The control and uniformity of embedded pit position, and dimensions establish a basis for the DDCS to compensate for variability of user recorded data by appropriate control algorithms.

Figure 4:
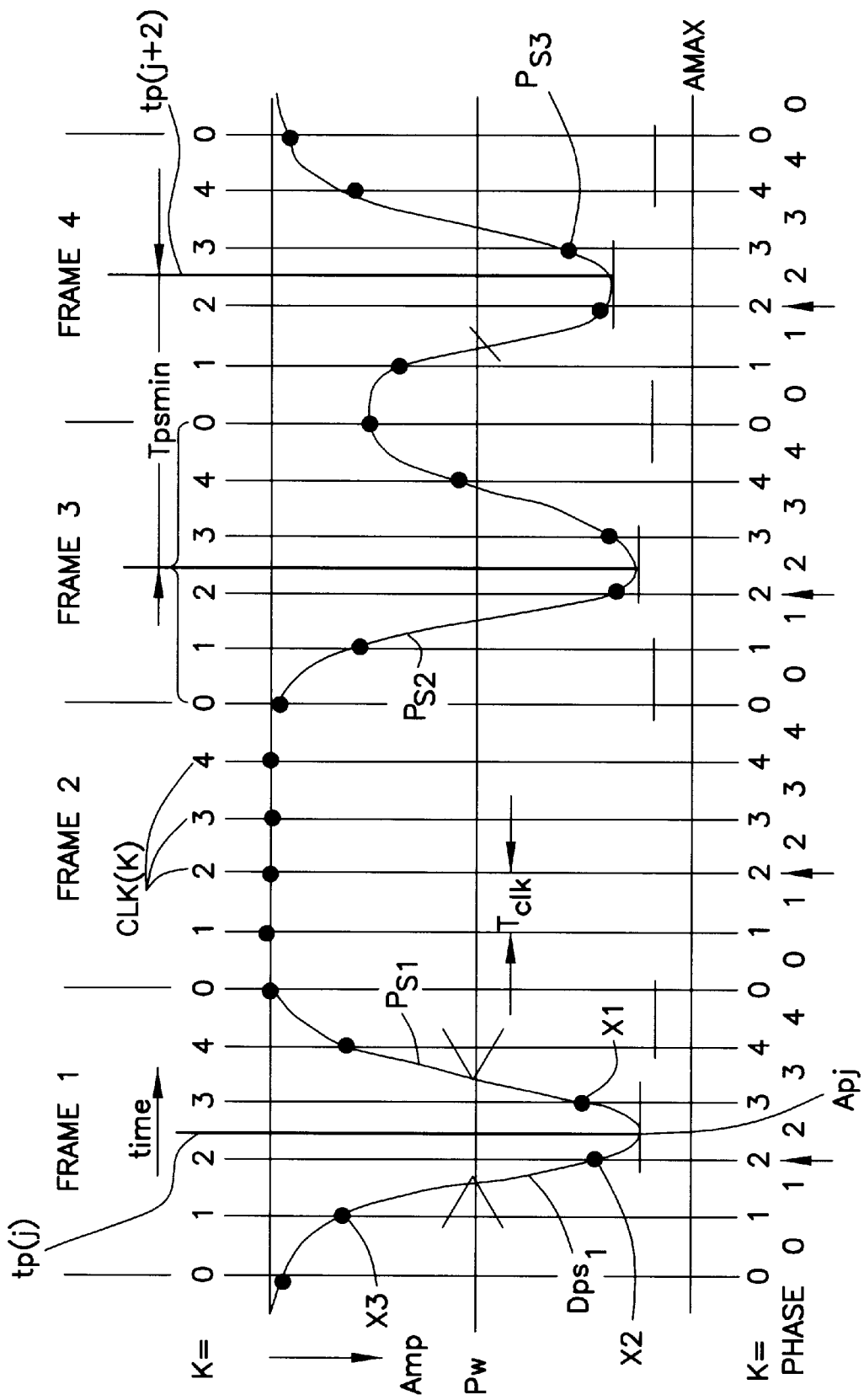
FIG. 4 is a depiction of a pulse waveform Dps1 from the data stream recovered from the disk of FIG. 1.
Figure 5:
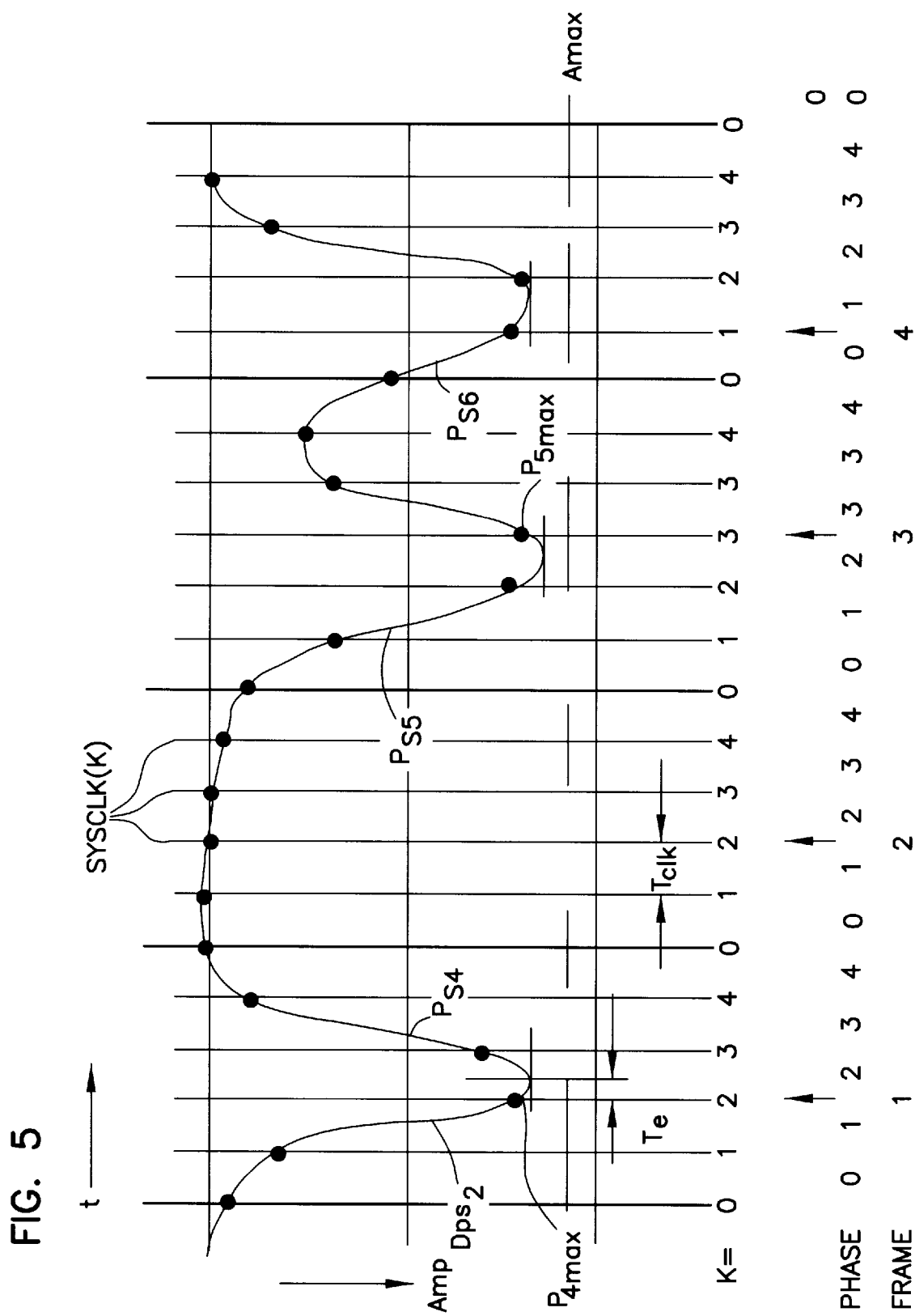
FIG. 5 illustrates another pulse waveform Dps2 from the data stream recovered from the disk of FIG. 1.

Referring now to FIG. 4 and FIG. 5, a first pulse signal waveform Dps1 and a second pulse signal waveform Dps2 comprising respective signal pulses Ps1 through Ps3 and pulses Ps4 through Ps6 are illustrated. Dps1 and Dps2 are displayed against a time axis increasing as indicated by the arrow time, and have amplitudes increasing (in the negative direction) indicated by the arrow Amp. In the preferred embodiment, the waveforms Dsp1 and Dsp2 may be obtained from a magneto-optical storage disk 102 using a head 108 (FIG. 1) comprising a magneto-optical (MO) read/write head. It is understood, however, that other embodiments of the present invention could include use in other types of drives and with other servo channels of, for example, magnetic, optical, or the like.

In the preferred embodiment, the MO read/write head 108 illuminates the moving disk surface 103 below with a focused microscopic laser light beam. Reflected light energy from the surface 103 is captured by optical elements (not shown) on the MO read/write head 108 and directed to a suitable photosensitive detector (not shown). The output of the photosensitive detector may comprise the respective signal Dps1 and Dps2. In this embodiment, no signal processing of Dps1 or Dps2 is presumed prior to that performed by the detection electronics 114. Alternatively, some simple pre-amplification and/or pulse shaping of the photo sensitive output signal may be employed before being processed by the detection electronics 114. The design of suitable pulse pre-amplification and/or pulse shaping is within the capability of one having ordinary skill in the arts of pulse amplification.

The signals from the detection electronics 114 are preferably processed by the digital disk drive control system DDCS of system 100 in terms of the presence or absence of recovered whole pulses that are representative of data stored on the disk 102. The detection electronics 114 of the present invention include three subsystems: a Pulse Detection Channel (PDC) circuit shown in FIG. 6; a Pulse Peak Synchronizer circuit PPS shown in FIG. 7; and a Servo Timing Mark Detector circuit STMD in FIG. 8, all described in further detail below.

The waveforms Dps1 and Dps2 are sampled at the transitions or ticks k of a system clock SYSCLK, spaced apart in time by a period Tclk. Ticks k are enumerated along the time axis of the FIG. 4, starting with a reference numeral 0 and cycling repetitively from 0 to 4. Preferably, each cycle of 5 clock ticks k represent a sample Frame, e.g., Frame1, Frame2, Frame3, Frame4, etc. Each pair of clock ticks k, k+1 represent a sample clock period or phase; i.e. sample tick k=0 to k=1 is phase 0; sample tick k=1 to k=2 is phase 1; etc.

In FIG. 4 the pulses Ps1, Ps2, Ps3 are sampled at ticks 0, 1, 2, 3, 4 and have respective amplitude at x(k=0), x(k=1), x(k=2), x(k=3), x(k=4). In FIG. 4, the pulses Ps1, Ps2, Ps3 are illustrated to comprise respective pulse peaks that occur within phase 2 of corresponding Frames1, Frames3, Frames 4. In the present invention, the pulse peaks are preferably recognized by the signal processing electronics 114 as logic one, conversely if no pulse peak is found, a logic zero will be recognized.

It is apparent that the detection process must not only recognize the presence (or absence) of a data pulse Ps1, Ps2, . . . Psj in each Frame1, Frame2, . . . Framej but must also synchronize the particular Framej with the expected data positions on the disk as well. The present invention provides an efficient, high speed and cost effective solution for both these requirements.

In the present invention, detection of the pulse peaks depends on a Tclk that is faster than the maximum frequency of the data pulses Ps1, Ps2, . . . Psj. For the preferred embodiment under discussion, the Tclk is about 5 times the fastest expected pulse rate; accordingly, the Tclk is about one fifth the minimum nominal pulse period, Tpsmin. An exemplary minimum pulse period Tpsmin is defined in FIG. 4 between the peak of Ps2 and the peak of Ps3.

In the present invention, each pulse peak occurs at a peak time instances tpj within a Framej. The amplitudes of pulse peaks and peak time instances tpj may exhibit variations caused by variations in: the power of the laser; recorded pit size, shape and position on the disk 102; the disk 102 rotational speed, eccentricity; and alignment offset between the read/write head 108 and the data tracks 220 (i.e. center line of the recorded data pits 303), and the like. It will be appreciated that the variation of the actual peak time instance tpj for each pulse Psj may cause time variations relative to the instances of the SYSCLK and ticks k and because the ticks, k, k+1, k+2, . . . and the recovered data pulses Ps1, Ps2, . . . Psj occur asynchronously, there may be precession of the data pulses Ps1, Ps2, . . . Psj with respect to Frame1, Frame2, . . . Framej. For example, in FIG. 4 if the waveform Dps1 precesses long enough, succeeding pulses Ps1, Ps2, −Psj may drift out of corresponding Frames, causing false data corresponding to these pulses to be detected by the system 100 (i.e., the waveform Dps1 may shift, say toward the right, wherein the pulse peak of Ps3 may occur in phase 1 rather than phase 2).

In the present invention, when a pulse peak of a particular data pulse Psj slips by a phase, a counter is changed by one count to re-center the next data pulse. As shown in FIG. 5, by changing the count of the counter, an additional tick is inserted in Frame3 so that the tick k on which the pulse peak of Ps5 is measured is tick 3 not tick 2. In this manner, as will be described below in further detail, the present invention provides that the pulse peaks of the data pulses Ps1, Ps2, −Psj may be found in about the same phase of a corresponding Framej such that succeeding pulses Psj that drift out of the corresponding Frame do not cause false data to be received by the system 100.

The present invention provides cycle slip correction between the phase of pulse peak instances Apj and the phase of a Framej derived from the fixed system clock such that asynchronous servo timing mark (STM) detection is accomplished. In an exemplary embodiment of the present invention which includes a 50 MHz SYSCLK the read time of a servo sector 212 (FIG. 2) is 3.6 ns long. With a spindle motor 104 speed control specified at +/−0.5%; an 18 ns slip, nearly an entire clock cycle, from the beginning of the servo sector to the end of the servo sector is possible. The pulse peak-synchronizing feature of the present invention corrects for the single clock phase slip automatically. Even greater phase slip can be accommodated by embodiments of this invention. Sampling is done asynchronously at a high frequency such that the pulses Psj are sampled over more than one tick k. A preferred embodiment of the method uses results based on a parabola fitted to three consecutive ticks x1, x2, and x3, to find the following:

1) An estimate Epj of the peak amplitude of a pulse Psj occurring in the interval of plus or minus half of a sample period tau, wherein:

$$x2 > x1 \text{ and } x2 > x3 ; \quad \text{Eq. 1}$$

2) An estimate Te of offset Tj of the instance of peak of a pulse Psj relative to the sampling instant tpj, wherein:

$$\text{Toffset} = \text{Tclk}/2 * (\{x1-x2\}/\{x1-2*x2+x3\}); \quad \text{Eq. 2}$$

3) An estimate Epj for the value of the peak of a pulse Psj, wherein:

$$Epj = x2 + (x1-x3)^2/(-x1+2*x2-x3)/8; \quad \text{Eq. 3}$$

4) A simple approximate value of the peak E'pj, within +/−4%, wherein:

$$E'pj = x2 + |x1-x3|/8; \quad \text{Eq. 4}$$

Referring now to FIG. 6, the present invention includes a digital Peak Detection Channel (PDC) circuit, with one PDC circuit per head 108. In the present invention waveforms may be sampled at a high rate by a high speed flash analog to digital converter and processed by the signal processing electronics 114.

The Pulse Detection Channel circuit PDC includes a gain controlled amplifier VGA 620 having a VGA input 622 which receives data pulses Psj. A gain control input 621 of the VGA 620 receives an output of a digital to analog converter DACg 619 that is driven by a register REGg 618. Register REGg 618 contains digital values contributed by compensation circuits (not shown) in the detection electronics 114. The compensation circuits provide for normalizing signal levels caused by regularly varying or predictable system features.

Pulse signal level normalization is done to compensate for variation of Psj pulse amplitudes due to the above mentioned variation causes. The VGA 620 provides a gain controlled analog output 624 to a digitizing input of a flash analog-to-digital converter (ADC) 626. The ADC 626 is clocked at 628 by SYSCLK time k to sample a normalized analog value Psj(k) of an incoming data pulse Psj at its input 624. The ADC 626 converts the analog value Psj(k) of the data pulse Psj into a digitized value x, k nearly instantaneously and provides the digitized signal x, k at its output 630. The ADC output 630 provides the digital value x, k at to an input of a first shift register REG3 631 that is also clocked by SYSCLK. The register REG3 631 stores the value x, k at the SYSCLK tick k while holding REG3 631 output 634 at its previous value x, (k−1).

At the next SYSCLK tick k+1, the ADC 626 provides a new digital sample x, k+1 at its output 630. REG3 631 stores the new value x, k+1 and provides the previous stored value x, k from its output x3 634 to the input of second shift register REG2 632. REG2 632 stores the value x, k and transfers its previous stored value x, (k−1) from its output x2 635 to the input of a third shift register REG1 633. REG1 633 stores the previous stored value x, (k−1) from REG2 632 and outputs its previously stored value x, (k−2) from its output x1 636 to one input 650 of adder logic block SUM1 651.

At the following SYSCLK tick k+2, the ADC 626 samples the output of the VGA 624 signal again and provides a new digital sample x, k+2 at its output. REG3 631 stores the new value x, k+2 and transfers the previous stored value x, k+1 from output x3 634 to the input of second shift register REG2 632. REG2 632 stores the value x, k+1 and transfers its previous stored value x, k from output x2 635 to the input of a third shift register REG1 633. REG1 633 stores the transferred value x, (k) from REG2 632 and outputs its previously stored value x, (k−1) from x1 636 to the one input 650 of an adder logic block SUM1 651. In brief, for each clock time, k, x1, (k)=x2, (k−1)=x3, (k−2)=x, (k−3).

The adder logic block SUM1 651 can be implemented as a simple full adder with the addition of a 3-bit shift to provide the divide by 8 function. At each tick k the adder logic block SUM1 651 computes the value of |x1(k)−x3(k)|/8 and provides the result SUM10, k=|x1(k)−x3(k)|/8 to the input of a fourth shift register REG4 655:

$$\text{SUM10}(k) = |x1(k)-x3(k)|/8 = |x,(k-3)-x,(k-1)|/8 ; \quad \text{Eqn. 5}$$

REG4 655 stores the value SUM10(k) at each tick k and outputs the previous computation result from SUM10 (i.e. REG40, (k)=SUM20, (k−1)) from REG40 661 to one input 656 of an adder logic block SUM2 657. The block SUM2 657 receives the x1, (k) output 658 of REG1 633 at its other input.

Block SUM2 657 computes the value of x1, (k) +REG40, (k) 656 and outputs the result SUM2, (k) 660 to an input of shift register REGp 661.

$$\begin{aligned}
\text{SUM20}, (k) &= x1, (k) + \text{REG40}, (k) \quad \text{Eqn. 6} \\
&= x(1, k) + \text{SUM10}, (k-1) \\
&= x1, (k) + |x, (k-4) - x, (k-2)| \\
&= x(k-3) + |x, (k-4) - x, (k-2)|)/8;
\end{aligned}$$

At clock tick k, REGp 661 outputs REGp0, (k) 662 which is the previous value of its input at clock tick (k−1); that is SUM20, (k−1).

The output REGp0, (k) 662 at each clock tick k, referring back to the three consecutive values xk−5, xk−4, xk−3 values from the ADC 626 is:

REGp0,(k)=
    SUM20,(k−1)=x(k−4)+|x(k−5)−x(k−3)|/8=Ep(k−2); Eqn. 7

REGp 661 will thus hold a value Epj, which approximates a particular peak of pulse Psj, two clock ticks after the last x value is sampled by the ADC 626 and there is a peak detected, i.e. at; x, k−4>x, k−3 and x, k−4>x, k−5 corresponding to x2≧x3 and x2>x1 from Eq. 1 above.

A comparator COMPt 673 receives the REG2 632 output x2, k 670 at one input and a DC threshold level TH 672 from an output of a threshold register REGt 676. REGt 676 receives inputs (not shown) from the DDCS to compensate for system variation as described above. The threshold level TH 672 is chosen to disable the generation of peak detection until the peak amplitude of the data pulse signals Psj reach an acceptable level. The actual value for TH will depend on the particular system and environment being considered.

When the magnitude of [x2, k−TH] is greater than 0, COMPt 673 will output 680 a logic one level to a first Df/f Dt1 681 that is clocked by SYSCLK. Dt1 feeds a second Df/f Dt2 689 having an output Dt2o 691. Output Dt2o 691 drives one input 692 of a three-input AND gate, ANDp3 694.

A second comparator COMPx 690 receives the output x2, k 635 of REG2 632 at one input 682 of COMPx1 690 and the output x3, k 634 of REG3 631 at another input of COMPx2 690. When the magnitude of [x3, k−x2, k] is greater than 0, COMPx 690 outputs a logic one level at its output COMPxo 685 to one input of third Df/f Dt3 698. Dt3 698 feeds a fourth Df/f Dt4 699 and an input 686 of an inverter INVx 700. Inverter INVx 700 feeds a second input 687 to ANDp2 694. Dt4 699 feeds a third input 688 to ANDp1 694. Both Dt3 698 and Dt4 699 and Both Dt1 681 and Dt2 689 transfer respective input levels to outputs level with a delay of one clock tick k when clocked by SYSCLK.

ANDp 694 will output a logic one level at output ANDpo 695 when all three ANDp 694 inputs are logic true. ANDpo 695 feeds a peak detect Df/f Dp 696 that is clocked by SYSCLK at each clock tick k. Dp 696 outputs 697 a logic one level one clock tick later than a one level on ANDpo 695.

The output of COMPt 673 at each clock tick k, is the logic value of |x2, (k)>TH|, i.e. a logic one when x2 635 at clock tick k is greater than TH 672. If the value of x2 is not greater than the TH 672 level, then a zero will be propagated through Dt1 681 and Dt2 689 so that, 2 clocks later the ANDp 694 will be disabled and no peak will be detected.

This ensures that low-level noise is not interpreted as an actual pulse detect. When X2>TH 672, then the ANDp 694 will be enabled two clocks later, in time for Df/f Dp 696 to output a valid peak detect level, if one has been detected.

The output PKDET 697 of Dp 696 is:

$$[INV(Dt3)]ANDp[Dt4]ANDp[Dt2], k-1 \text{ at clock}=k-1; \quad \text{Eqn. 8}$$

Where;

$$Dt2,k=[COMPt,k-2]=[x2,k-2]>[TH]=[x,k-4]>[TH]; \quad \text{Eqn. 9}$$

$$COMPxo,k=[x2,k]>[x3,k]; \quad \text{Eqn. 10}$$

$$[Dt4,k]=[COMPx,k-2]=[x2,k-2]>[x3,k-2]=[x,k-4]>[x,k-3]; \quad \text{Eqn. 11}$$

$$[Dt3]=COMPxo,k-1=[x,k-3]>[x,k-2]; \quad \text{Eqn. 12}$$

The logical peak detect level PKDET 697 is true when:

$$Dp=[INV[[x,k-4]>[x,k-3]]]ANDp\ [[x,k-5]>[x,k-4]]ANDp[[x,k-5]>[TH\ ]]; \quad \text{Eqn. 13}$$

It is understood that the circuit of FIG. 6 may use registers REG3 631, REG2 632, REG1 633 to store the waveforms of FIGS. 4 and 5. The comparator COMPx 690 in combination with the delay of the Df/f Dt3 698 and the inverter INVx 700 provides both the result of x2>x1 and x2≧x3 by making the comparison x3>x2 and inverting it at INVx 700 which yields the desired x2≧x3. The delay of the x2>x1 comparison by the Df/f Dt4 699 allows both the necessary comparisons to be applied to the AND gate ANDp 694 at the same time.

FIG. 6, and the signs of the equations 1, 2, 3 and 4 above are described in terms of positive pulses and positive logic. The operation of the invention is equally valid for negative going pulses and negative logic with appropriate adjustment for sign.

The PDC circuit will be recognized as a pipeline processing circuit that takes advantage of reusing the same circuitry again and again in different clock cycles for different computations. The results of computations in one cycle are stored and combined with results of computation with the same or different circuit elements in other cycles.

An alternate embodiment of the present invention is contemplated in which the logic blocks SUM1 651 and SUM2 657 compute the more accurate estimate of Epj, given by Equation 3 above. The necessary modifications of the connections and internal logic elements of the blocks SUM1 651 and SUM2 657 to achieve the above result are within the capability of a circuit engineer having ordinary skill in the art.

Referring now to FIG. 7, there is shown a schematic diagram of a Pulse Peak Synchronizer PPS circuit in accordance with this invention. In the preferred embodiment, the PPS circuit synchronizes the peaks of pulses Psj to a Framej when the pulses Psj shift relative to the ticks k of the SYSCLK. The PPS circuit receives the PKDET 800 output from the PDC circuit at a first input 1 of each of 3 respective 2-input AND gates ANDd1 805, ANDd2 810, ANDd3 815, and to a first input 1 of each of two three input AND gates ANDd0 801, ANDd4 820. A divide by 5 counter count5 850 has a clock input count5cc 851 connected to the system sample clock SYSCLK at 628. An output bus OP5 853 from count5 850 supplies the first 3 bits bit(0,1,2) of the counter count5 850. The bits bit (0,1,2) step by one count with each clock pulse of the SYSCLK, counting repetitively from binary 0 to binary 4 and returning to 0, i.e., 000, 001, 010, 011, 100, 000.

Count5 850 has a load input Load3 855, which loads the counter with the count of 3 independent of the state of count5 850.

Five separate 3-input 1-out-of-five Decoders, DEC0 825, DEC1 830, DEC2 835, DEC3 840 and DEC4 845 are connected to the bus OP5 853. Each Decoder has a respective output DEC0 826, DEC10 831, DEC20 836, DEC30 841, DEC40 846. Each respective input, e.g. bit 0, bit 1, bit 2 of each decoder is connected to the corresponding bit of bit (0,1,2) of OP5 853. The 1-out-of-5 decoders output a logic true at their respective outputs when each decodes a respective binary count: DEC0 825 outputs 1 at count 0, DEC1 830, a 1 at count 1, DEC2 835 a 1 at count 2, DEC3 840 a 1 at count 3, DEC4 845 a 1 at count 4.

Each decoder output DEC0O 826, DEC10 831, DEC20 836, DEC30 841, DEC40 846 is connected separately to a respective second input 2 of the corresponding AND gates ANDd0 801, ANDd1 805, ANDd2 810, ANDd3 815, ANDd4 820.

Each of the two AND gates AND0 801 and AND4 820 have a respective third input 3 each connected to an output INVR0 of an inverter INVR 860. Inverter INVR 860 has an input INVR1 connected to an output DRUNo of a D flip-flop DRUN 870. DRUN 870 has a data input D 882 connected to output ANDRO of a two input AND gate ANDR 880. DRUN 870 has a clock input C 883 connected to the sample clock SYSCLK 628.

Input 2 of ANDR 880 is connected to an output O1o 889 of a three input OR gate O1 888. Input 1 of ANDR 880 is connected to output O2o 884 of two input OR gate O2 886.

Input signals search-STM 890, Read_Data 895, and Read_PES 900 (to be described below) are provided to the PPS circuit. Input 1 of two input OR gate O2 886 is connected to the output DRUNo 895. Input 2 of O2 886 comes from an output 852 of a 5 input OR gate 850. Each input 0 through 4 of OR gate 850 is separately connected to a respective one of the corresponding outputs of the AND gates ANDd0–ANDd4 (801, 805, 810, 815, & 820).

The output AND4o 694 also forms the output Enable-Data 905 which is used to mark the transition from one Frame to another Frame (Refer to FIGS. 4 and 5) for the operation of subsequent data recovery logic blocks (described below) of the system 100.

The OR 850 has an output 852 connected to the Load3 855 input of counter count5 850. The output 852 also connects to input 1of the OR gate O2 886 and also connects to a data input d of a D flip-flop DataD 910. The DataD flip-flop 910 has a clock input c 915 connected to the SYSCLK. The DataD flip-flop 910 has an output 854, which is delayed one system clock pulse from its input.

While the system is searching for a servo timing mark (STM), the signal search-STM 890 is low. At every clock of the SYSCLK with search-STM low 890 the DRUN 870 latch will be reset and INVRO 860 will be high enabling any peak detected within the 5 count frame to set OR gate output 852 high. If a peak is detected (PKDET=1) and the DRUN 870 latch is high, the Search-STM input 890 resets the run latch DRUN 870 when the STM was not found (Search-STM=0 and Read_Data, Read_PES are low). When the DRUN latch 870 is reset, the counter count5 850 is loaded with the value 3 920 when a peak is detected independent of the previous counter state. This means that the counter count5 850 started at count two when the peak occurred.

This ensures a peak of a pulse Psj is centered in a Framej (refer to FIGS. 4 and 5) when a peak is detected while still searching for the servo timing mark. When the first peak occurs the DRUN latch 870 is set. When the DRUN latch 870 is set the counter only loads itself with 3 if the peak was detected and the count is 1, 2, or 3. Thus the counter count5 850 is allowed to adjust its count or phase plus one or minus one count from the phase of the last peak detect in normal operation when reading a servo sector. With regard to FIG. 5, it can be seen that a peak will be detected on clock phase3 of Frame3. In normal operation the PPS circuit will load the value 3 and reset the phase count, adding another clock phase to Frame3. It can be seen then, that the PPS circuit adjusts the clock phase in the Frame3 to re-center the peak of pulse Psj, j=3 at the clock 2. This ensures that each pulse detected remains within the logic bit frame expected. Logic operations performed by the system 100 on the recognized pulses will be synchronized thereby to the proper data bit Framej.

Referring now to FIG. 8, the present invention further includes a Servo Timing Mark Detector (STMD) circuit. In the present invention when a servo timing mark is first detected, succeeding values of pulse peak and amplitudes of the pulses Psj within corresponding Framej may preferably be processed accurately, for example even with the eccentric movement of the disk 102. The values are stored, and when other predetermined conditions are met, the signal processing electronics 114 processes the values to take corrective action. The location of the servo timing mark is used for maintaining the alignment of the pulses Psj relative to a Framej.

FIG. 8 shows an implementation of the STMD circuit of the present invention. The STMD circuit receives the sampling clock SYSCLK at 628 from the system 100 and the inputs DataD0 854, Enable-Data 905, and the DRUN0 921 from the PPS circuit. The signal Enable_Data 905 comes from the signal Enable_Data 905 in FIG. 7. Each clock input c of four D flip flops Dp1 1000, Dp2 1010, Dp3 1015, Dp4 1020 is connected to SYSCLK at 628. Each enable input e 1025 of the four D flip-flops Dp1 1000, Dp2 1010, Dp3 1015, Dp4 1020 is common to the Enable_Data input 905. Propagation of the signal run through the 4 flip flops will be disabled when signal Enable_Data 905 is low.

Twelve other D flip flops Dd0, Dd1, - - - Dd11 1025, each having their own data input Ddd 854, delayed output dbO 1030, enable input Dee 905, and clock input Dcc 629 are connected in a chain, the output O-k from Dd(k) connects to the input d of Dd((k+1)), 0<k<10. Each clock input Dcc 629 of each flip flop Dd(k) 1025 is connected to SYSCLK and each enable input Dee of each flip-flop Dd(k) 1025 is connected to signal Enable_Data 905.

The input Ddd 854 of Do in FIG. 8 is connected to the output 854 of FIG. 7, i.e. signal DDATA 910. Each flip flop Dd0 through Dd11 1025 form the respective data bit Db0 though Db11 1030 from which the system 100 derives sector address (and part of the PES values).

Each instance of a pulse on Enable_Data 905, (that is 5 SYSCLK ticks or one Frame) loads the current value of DDATA 910 into the first bit of the shift register Dd0–Dd11 1025 and shifts the last stored value of each bit to the next bit location. If a peak has been detected within the logic frame, a one will be loaded, otherwise a zero.

Outputs of the STMD circuit (FIG. 8) are output search-STM 890, output Read_PES 900, output Read_Data 895, and 12 bits of data Db0 through Db11 1030.

Input Run feeds a first data input d 921 of the string of four D flip-flops: Dp1 1000, Dp2 1010, Dp3 1015, Dp4 1020. Each of these flip-flops have respective SYSCLK input c 629, data input d 921, enable input e 1025 and output O 950. Flip-flop Dp1 1000 feeds Dp2 1010 which feeds Dp3 1015 which feeds Dp4 1020 to create a 4 SYSCLK delay between the input Run 921 at Dp1 and the output O of Dp4 950. Dp4 1020 feeds an input 950 of inverter INVp 953. INVp 953 has an output 952 (INVpO) which forms the signal Search_STM, i.e. the input search_STM 890 of FIG. 8. That is, search_STM 890 is the inversion of the signal RUN 921 and delayed by four clocks of SYSCLK 628.

In this embodiment, this enables a four bit servo timing mark pattern 310 (refer to FIG. 3) to be detected before negating the search-STM signal 890 when the four bits of the servo timing mark pattern are loaded in Dd0–Dd3 1025, and have been preceded by three 0's loaded in Dd4–Dd6 1025.

The data pattern on the disk (refer to FIG. 1) is arranged to precede the servo timing mark pattern with several zeros, in this case 3. The three preceding zeros prevent dirt particles from inadvertently being interpreted as a servo timing mark.

The outputs of Dd0 and Dd3 1025 are respectively connected to inverters ID0 1005, ID3 1006. Inverters ID0 1005, ID3 1006 have respective outputs Id0\ 1007, Id3\ 1008 connected to inputs 0 and 3 of 7-input OR gate 955. Inputs 1,2,4,5,6, of 955 are connected to respective outputs Dd1, Dd2, Dd4, Dd5, Dd6 1025. Output 956 of OR 955 is connected to inverter 960. Inverter 960 supplies output 962 to a data input 964 of a 12-bit counter 966. Counter 966 has clock input 976 connected to SYSCLK and an enable input 968 connected to the Enable-Data signal 905. Counter 966 has an output 972 which is delayed by 12 clocks of SYSCLK 628 pulses when enabled by a logic true on 968. Since pulses of Enable-Data 905 are ticks of SYSCLK divided by 5, counter 966 will delay the output 972 until all 12 bits of the sector address are loaded into the flip-flops Dd0–Dd11 1025. When all sector address bits are loaded into Dd0–Dd11 1025, output 972 (Read_Data) goes high, indicating to the system 100 to access the sector address. This also sets the DRUN latch 870 when enabled by ANDR 880.

Read_Data 895 also is connected to input 974 of a 20-bit counter 975. Counter 975 has a clock input 976 connected to the system sample clock SYSCLK and an enable input 978 connected to Enable_Data 905. Once the servo timing mark has been detected, Read_Data 895 goes high, triggering the counter 975.

Twenty successive Enable_Data 905 pulses increment counter 975 until Read_PES 900 goes high indicating to the system 100 to gate the corresponding 20 DDATA 854 values from the PPS circuit to position error signal (PES) generation circuitry (not shown). Output 900 of counter 975 is the Read_PES signal 900. Read_PES 900 enables the ANDR 880 (see FIG. 8) AND gate to set the run latch DRUN 870 when O2o 886 is true. Read_PES 900 also provides a signal to the system 100 indicating availability of the 20 bits of PES data (refer to FIG. 3).

Thus, the PPS circuit in combination with the PDC and STMD circuits provide the system 100 with an efficient self synchronizing pulse data detection method, keeping pulse peaks within a logic bit frame, while allowing for disk speed variations within the desired system tolerances. This is accomplished with the use of simple, low cost logic and analog components with minimal component count.

Alternative embodiments of this invention can be implemented with straight forward scaling of servo timing mark (STM) bit patterns, bit pattern lengths and additions to or deletions of the following address and position error signal (PES) data structures.

Although not described here in detail, the values of the estimated peaks Epj and peak instances Tpj of detected pulses Psj may be calculated from the PV values output by the REGp 661 register of the PDC circuit by computing components of the system 100 using the Equations 1–4 presented above. These estimated values may be used by the system 100 and alternative systems for the improvement of system performance.

It is anticipated that alternative systems may have some portions of the logic of the PDC, PPS, and STMD circuits may be implemented in parallel rather that pipelined logic for higher performance at slightly higher cost. The transformation of the logic from pipelined to parallel is within the capability of a skilled logic designer.

The number of phases in the logic frame may also be selected (e.g. more phases or less) in response to differing system signal to noise ratios and disk speed tolerances.

It is to be understood that the above description is illustrative only and not limiting of the disclosed invention. It will be appreciated that it would be possible to modify the size, shape and appearance and methods of manufacture of various elements of the invention or to include or exclude various elements within the scope and spirit of this invention. Thus the invention is to be limited only by the claims as set forth below.

What is claimed is:

1. In a disk drive system having an output providing an analog signal including a sequence of analog data pulses, Dpsj, recovered from stored data on a storage disk, the data pulses having pulse widths of about width Pw and peaks having magnitudes of about Apj at instances of about tpj, a digital peak detection channel comprising:
   a. an analog input of a device receiving continuous analog values of the sequence of signal data pulses;
   b. the device responsive to a sampling clock by sampling said analog signal at 3 successive sample clock times k−1, k, (k+1), and converting each said analog value to a corresponding digital value x1, x2, x3, the sampling clock having a sample period of less than about Pw/3;
   c. a digital output of the device outputting said sampled digital values x1, x2, x3 to corresponding registers REG1, REG2, REG3; and
   d. a comparator connected to said registers, said comparator having a peak detect output with a logic signal level at a true logic value when the logic value ((x2>x1) AND (x2>x3)) is true, whereby a peak of a data pulse is indicated to have occurred between the sample period k minus one period and the sample period k plus one period.

2. The disk drive system of claim 1, including a data sample period to logic frame phase synchronizer, in which the peaks occur at a rate incommensurate with the sample clock period, Tclk, comprising:
   a. a logic bit frame generator capable of generating a logic bit frame comprised of a plurality 0, 1, . . . m phases, in which each phase is one sample period k;
   b. a logic block having an input connected to the peak detect output, and an output connected to the logic fame generator;
   c. the logic block responsive to the occurrence of a first peak detect indication at said input at phase n of a first logic frame and to the occurrence of a second peak detect indication at phase n+1 or phase n−1 of a second frame configured to cause the logic bit frame generator to adjust the phase of the logic bit frame by minus one period or plus one period respectively.

3. The digital peak detection channel of claim 1, including a servo timing mark (STM) pattern recognizer, comprising:
   a. an n+1 bit shift register having an input connected to the peak detect output;
   b. a bit pattern logic block having inputs 0, 1, . . . , n, each of which connects to a corresponding one of the bits of the shift register, the logic block having an STM output, the logic block containing a plurality of logic gates configured to a predetermined bit pattern, bit(0) through bit (n), the bit pattern logic block further configured to set STM at a true logic output, if an only if each input of the logic block has a logic value equal to the corresponding bit of the predetermined bit pattern.

4. The disk drive system of claim 1, including a data pulse peak magnitude estimator, further comprising:
   computation means for computing an estimate Epj of pulse peak amplitude Apj of a pulse Dpsj, detected by a true logic value on the peak detect output.

5. The disk drive system of claim 4, in which the estimate Epj is computed as x2+(x1−x3)^2/(−x1 +2*x2−x3), the disk drive further comprising a connection configured to provide the estimate Epj to the disk drive system.

6. The disk drive system of claim 4, in which the estimate Epj is computed as x2+|x1−x3|/8, the disk drive further comprising a connection configured to provide the estimate Epj to the disk drive system.

7. The disk drive system of claim 1, including a data pulse peak instance offset estimator for estimating the offset, Toffset, from the actual instance, tpj, of a peak occurrence of a data pulse peak Apj relative to a sample clock instance k, and the sample period is Tclk, the disk drive system further comprising:
   a. computation means connected to the registers REG1, REG2, REG3 for computing the algorithm, Toffset= Tclk/2*({x1−x3}/{−x1−2*x2−x3}); and
   b. a connection configured to provide the Toffset to the disk drive system.

8. The disk drive system of claim 1, wherein the storage disk is a magneto-optical storage disk.

9. The disk drive of claim 1, wherein the device comprises an analog to digital converter.

10. The disk drive system of claim 1, further comprising a synchronizer for shifting the indication of the peak in the analog pulses relative to the sampling times.

* * * * *